United States Patent [19]

Uda et al.

[11] 4,454,276

[45] Jun. 12, 1984

[54] POLYAMIDE ACID COMPOSITION FOR PREPARING POLYIMIDE AND PROCESS FOR PREPARING POLYIMIDE FROM THE SAME

[75] Inventors: Junji Uda; Tsuneo Yamamoto, both of Ootsu; Takumi Kosugi, Kobe, all of Japan

[73] Assignee: Kanegafuchi Chkagaku Kogyo Kabushiki Kaisha, Osaka, Japan

[21] Appl. No.: 428,394

[22] Filed: Sep. 29, 1982

[30] Foreign Application Priority Data

Jan. 8, 1982 [JP] Japan .................................. 57-1928
Jan. 8, 1982 [JP] Japan .................................. 57-1929

[51] Int. Cl.³ .................... C08G 73/10; C08K 5/07; C08K 5/16; C08K 5/20
[52] U.S. Cl. .................... 524/209; 524/210; 528/188; 524/218; 524/233; 524/284; 524/285; 524/287; 524/290; 524/299; 524/317; 524/320; 524/356; 524/358; 524/359; 524/360; 524/361; 524/362; 524/600; 528/125; 528/126; 528/128; 528/172; 528/179; 528/182; 528/207; 528/208; 528/220; 528/224; 528/229; 528/350; 528/351; 528/352; 528/353

[58] Field of Search .............. 524/357, 600, 209, 210, 524/218, 233, 284, 285, 287, 290, 259, 317, 320, 356, 358, 359, 360, 361, 362; 528/125, 126, 128, 172, 179, 188, 182, 207, 208, 220, 224, 229, 350–353

[56] References Cited

U.S. PATENT DOCUMENTS 3,541,036 11/1970 Libackyi ............................ 524/357
3,898,199 8/1975 Biensan et al. ..................... 524/357
4,183,835 1/1980 Yamaguchi et al. ................ 524/600

*Primary Examiner*—Lester L. Lee
*Attorney, Agent, or Firm*—Armstrong, Nikaido, Marmelstein & Kubovcik

[57] ABSTRACT

A polyamide acid composition for preparing a polyimide which can extend the pot life of the composition comprising a solution of a polyamide acid in an organic solvent, the polyamide acid being a precursor of the polyimide, a dehydrating agent, a catalyst and a pot life extending agent which can lower a rate of conversion of the polyamide acid to the polyimide, and the process for preparing the polyimide from said polyamide acid composition. According to the present invention the pot life can be extremely extended to give the composition an enough flowability for a long time without reducing the excellent properties such as a heat resistance and an electric insulation of the obtained polyimide.

8 Claims, No Drawings

4,454,276

POLYAMIDE ACID COMPOSITION FOR PREPARING POLYIMIDE AND PROCESS FOR PREPARING POLYIMIDE FROM THE SAME

BACKGROUND OF THE INVENTION

The present invention relates to a polyamide acid composition for preparing a polyimide and a process for preparing a polyimide from the same.

A polyimide has an excellent heat resistance and electric insulation, and is useful as electric and electronic parts, electric insulating materials and aircraft parts which are used at a high temperature.

However, it is difficult to mold the polyimide itself due to its excellent heat resistance. Therefore, the polyimide product is, in general, prepared by molding a solution of a polyamide acid in an organic solvent (hereinafter referred to as "polyamide acid solution") which is a precursor of the polyimide, and then converting the polyamide acid to the polyimide.

As a process for converting the polyamide acid to the polyimide there are known (A) a process by evaporating a solvent in the polyamide solution by heating, and at the same time thermally converting the polyamide acid to the polyimide; and (B) a process by chemically converting the polyamide acid to the polyimide with a dehydrating agent and a catalyst; and a process of the combination of the processes (A) and (B).

In the process (B), there are known two processes, that is, (B-1) a process by molding a polyamide acid solution, and then immersing into a converting bath prepared with a dehydrating agent and a catalyst, and (B-2) a process by molding a homogeneous admixture of a polyamide acid solution, a dehydrating agent and a catalyst.

Those processes have, however, the following defects. As to the process (A), the heating should be carried out quite gradually in order to avoid generation of voids, and water which yields during the conversion of the polyamide acid to the polyamide causes hydrolysis of the obtained polyimide to make charactaristic properties of the polyimide reduce. As to the process (B-1), it takes a long time to convert the polyamide acid to the polyimide, and a degree of the conversion in the surface of the molding and that of the interior are not uniform. On the other hand, the process (B-2) does not have such defects as those in the processes (A) and (B-1). In the process (B-2), however, the conversion of the polyamide acid to the polyimide is drastically accelerated just after the dehydrating agent and the catalyst are added to the polyamide acid solution. As a result, the polyamide acid is gelled in a short time. Therefore, in case of employing the process (B-2), the molding operation, particularly continuous molding operation, is difficult because the pot life of the polyamide acid composition is very short.

When the dehydrating agent and the catalyst are added to the polyamide acid solution, the polyamide acid converts to the corresponding polyimide by dehydration and ring closure. In the course of the conversion, the polyamide acid is increased in viscosity, gelled, and then hardened. Accordingly, molding operation must be carried out within a period during which the polyamide acid is not yet gelled. A time of period required for molding operation is varied depending on a molding apparatus and a molding manner. In the continuous molding operation, since the polyamide acid is gelled during staying in a tube and the staying in the tube is impossible to avoid, it is preferable that the pot life which is determined by a kind of the polyamide acid, a kind of solvent, a concentration of the polyamide acid solution, and kinds and amounts of the dehydrating agent and the catalyst is longer than the time of period for molding operation. If the pot life is shorter than the time of period for molding operation, the pot life can be extended by altering kinds and amounts of the dehydrating agent and the catalyst. In that case, however, the producibility is lowered because the rate of the conversion is lowered, and the properties of the obtained polyimide are inferior to the polyimide prepared by the process (B-2).

In the above-mentioned conventional processes, in order to eliminate such defects, the polyamide acid composition is maintained at a low temperature. As a result, the activities of the dehydrating agent and the catalyst are reduced. By such manner, however, the flowability of the polyamide acid solution decreases due to increase of the viscosity of the solution by cooling, and it is difficult to maintain the solution at the low temperature due to heat generation by admixing the dehydrating agent and the catalyst to the polyamide acid solution. As a result, enough pot life cannot be obtained. Therefore, the cooling is not an effective treatment, either.

OBJECTS OF THE INVENTION

An object of the present invention is to provide a novel polyamide acid composition which can extend the pot life and a process for preparing a ployimide from the polyamide acid composition. According to the present invention, the pot life of the polyamide acid composition can be extended while maintaining the advantageous effects of the process (B-2), that is, the excellent producibility based on the high conversion of the polyamide acid to the polyimide, and the excellent properties of the obtained polyimide based on the inhibition of hydrolysis of the polyimide.

SUMMARY OF THE INVENTION

The present invention relates to a polyamide acid composition for preparing a polyimide which can extend the pot life comprising an organic solvent solution of a polyamide acid, a dehydrating agent, a catalyst and a pot life extending agent which can lower a rate of conversion of the polyamide acid to the polyimide, and a process for preparing the polyimide by admixing the organic solution of the polyamide acid, the dehydrating agent, the catalyst and the pot life extending agent to give the polyamide acid composition, and converting the polyamide acid composition to the polyimide.

According to a preferable embodiment of the present invetnion, the polyamide acid composition is prepared by blending a homogeneous admixture of the dehydrating agent, the catalyst and the pot life extending agent together with the organic solution of the polyamide acid.

DETAILED EXPLANATION OF THE INVENTION

An example of the preferable pot life extending agent is at least one member selected from the group consisting of a compound of the general formula (I):

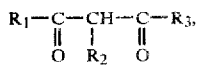

a compound of the general formula (II):

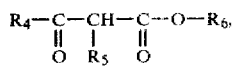

a compound of the general formula (III):

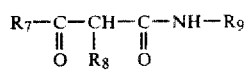

and a compound of the general formula (IV):

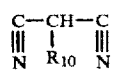

wherein $R_1$, $R_3$, $R_4$, $R_6$, $R_7$ and $R_9$ are the same or different and each is an aliphatic group having 1 to 12 carbon atoms or an aromatic group, $R_2$, $R_5$, $R_8$ and $R_{10}$ are hydrogen, an aliphatic group having 1 to 12 carbon atoms or an aromatic group, and $R_1$ and $R_3$, $R_4$ and $R_6$, $R_7$ and $R_9$ in the respective formula may be bound together to form a ring.

Examples of the compound of the general formula (I) are, for instance, acetylacetone, 2,4-hexanedione, 2,4-heptanedione, 2,4-octanedione, 3,5-heptanedione, 3,5-octanedione, 3,5-nonanedione, 4,6-nonanedione, 4,6-decanedione, 5,7-undecanedione, 3-methyl-2,4-pentanedione, 3-ethyl-2,4-pentanedione, 3-propyl-2,4-pentanedione, 3-methyl-2,4-hexanedione, 3-ethyl-2,4-hexanedione, 3-propyl-2,4-hexanedione, 3-methyl-2,4-heptanedione, 3-ethyl-2,4-heptanedione, 3-propyl-2,4-heptanedione, 3-methyl-2,4-octanedione, 3-ethyl-2,4-octanedione, 3-propyl-2,4-octanedione, 4-methyl-3,5-heptanedione, 4-ethyl-3,5-heptanedione, 4-propyl-3,5-heptanedione, 4-methyl-3,5-octanedione, 4-ethyl-3,5-octanedione, 4-methyl-3,5-nonanedione, 4-ethyl-3,5-nonanedione, 5-methyl-4,6-nonanedione, 5-ethyl-4,6-nonanedione, 5-methyl-4,6-decanedione, 5-ethyl-4,6-decanedione, 6-methyl-5,7-undecanedione, 6-ethyl-5,7-undecanedione, benzoylacetone, 1,3-diphenyl-1,3-propanedione, and the like.

Examples of the compuond of the general formula (II) are, for instance, methyl acetoacetate, ethyl acetoacetate, propyl acetoacetate, butyl acetoacetate, pentyl acetoacetate, hexyl acetoacetate, heptyl acetoacetate, octyl acetoacetate, phenyl acetoacetate, methyl pentanoat-3-one, ethyl pentanoat-3-one, propyl pentanoat-3-one, butyl pentanoat-3-one, pentyl pentanoat-3-one, hexyl pentanoat-3-one, heptyl pentanoat-3-one, octyl pentanoat-3-one, phenyl pentanoat-3-one, methyl hexanoat-3-one, ethyl hexanoat-3-one, propyl hexanoat-3-one, butyl hexanoat-3-one, pentyl hexanoat-3-one, hexyl hexanoat-3-one, heptyl hexanoat-3-one, octyl hexanoat-3-one, phenyl hexanoat-3-one, methyl heptanoat-3-one, ethyl heptanoat-3-one, propyl heptanoat-3-one, butyl heptanoat-3-one, octyl heptanoat-3-one, phenyl heptanoat-3-one, methyl-2-methylbutanoat-3-one, methyl-2-ethylbutanoat-3-one, methyl-2-propyl-butanoat-3-one, ethyl-2-methylbutanoat-3-one, propyl-2-methylbutanoat-3-one, butyl-2-methylbutanoat-3-one, phenyl-2-methylbutanoat-3-one, ethyl-2-ethylbutanoat-3-one, propyl-2-ethylbutanoat-3-one, phenyl-2-ethylbutanoat-3-one, ethyl-2-propylbutanoat-3-one, propyl-2-propylbutanoat-3-one, phenyl-2-propylbutanoat-3-one, methyl-2-phenylbutanoat-3-one, ethyl-2-phenylbutanoat-3-one, phenyl-2-phenylbutanoat-3-one, methyl-3-phenylpropanoat-3-one, ethyl-3-phenylpropanoat-3-one, phenyl-3-phenylpropanoat-3-one, methyl-2-methyl-3-phenylpropanoat-3-one, methyl-2-ethyl-3-phenylpropanoat-3-one, ethyl-2-ethyl-3-phenylpropanoat-3-one, methyl-2-methylpentanoat-3-one, ethyl-2-methylpentanoat-3-one, propyl-2-methylpentanoat-3-one, methyl-2-ethylpentanoat-3-one, ethyl-2-ethylpentanoat-3-one, octyl-2-ethylpentanoat-3-one, phenyl-2-ethylpentanoat-3-one, methyl-2-propylpentanoat-3-one, propyl-2-propylpentanoat-3-one, octyl-2-propylpentanoat-3-one, phenyl-2-propylpentanoat-3-one, methyl-2-phenylpentanoat-3-one, ethyl-2-phenylpentanoat-3-one, ethyl-2-phenylpentanoat-3-one, propyl-2-phenylpentanoat-3-one, octyl-2-phenylpentanoat-3-one, phenyl-2-phenylpentanoat-3-one, methyl-2-methylhexanoat-3-one, ethyl-2-methylhexanoat-3-one, propyl-2-methylhexanoat-3-one, octyl-2-methylhexanoat-3-one, phenyl-2-methylhexanoat-3-one, methyl-2-ethylhexanoat-3-one, ethyl-2-ethylhexanoat-3-one, octyl-2-ethylhexanoat-3-one, phenyl-2-ethylhexanoat-3-one, methyl-2-propylhexanoat-3-one, ethyl-2-propylhexanoat-3-one, propyl-2-propylhexanoat-3-one, octyl-2-propylhexanoat-3-one, phenyl-2-propylhexanoat-3-one, methyl-2-phenylhexanoat-3-one, ethyl-2-phenylhexanoat-3-one, propyl-2-phenylhexanoat-3-one, butyl-2-phenylhexanoat-3-one, octyl-2-phenylhexanoat-3-one, phenyl-2-phenylhexanoat-3-one, and the like.

Examples of the compound of the general formula (III) are, for instance, N-methylbutanamid-3-one, N-ethylbutanamid-3-one, N-propylbutanamid-3-one, N-butylbutanamid-3-one, N-octylbutanamid-3-one, acetoacetanilide, acetoacetotoluidide, N-methylpentanamid-3-one, N-ethylpentanamid-3-one, N-propylpentanamid-3-one, N-octylpentanamid-3-one, N-phenylpentanamid-3-one, N-methylhexanamid-3-one, N-ethylhexanamid-3-one, N-propylhexanamid-3-one, N-octylhexanamid-3-one, N-phenylhexanamid-3-one, N-methylheptanamid-3-one, N-ethylheptanamid-3-one, N-propylheptanamid-3-one, N-octylheptanamid-3-one, N-phenylheptanamid-3-one, N-methyl-3-phenylpropanamid-3-one, N-ethyl-3-phenylpropanamid-3-one, N-propyl-3-phenylpropanamid-3-one, N-methyl-2-methylbutanamid-3-one, and the like.

Examples of the compound of the general formula (IV) are, for instance, malononitrile, 2-methylpropanedinitrile, 2-ethylpropanedinitrile, 2-propylpropanedinitrile, 2-octylpropanedinitrile, 2-phenylpropanedinitrile, and the like.

Preferable examples of the above compounds are acetylacetone, methyl acetoacetate, ethyl acetoacetate, acetoacetanilide, malononitrile and an admixture thereof.

The pot life extending agent can extend the pot life of the known polyamide acid compositions at low temperature. However, when the pot life extending agent is used, the rate of the conversion of the polyamide acid to the polyimide can increase by heating as high as the rate of the conversion of the polyamide acid composition without the pot life extending agent.

A preferable polyamide acid which is a precursor of the polyimide has a repeated unit of the general formula (VIII):

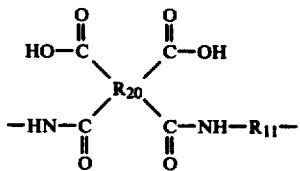

(VIII)

wherein $R_{11}$ is a phenylene group, a naphtalene group, a biphenylene group or a bivalent aromatic group of the general formula (VI):

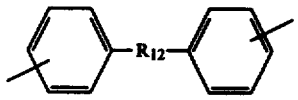

(VI)

in which $R_{12}$ is an alkylene group having 1 to 4 carbon atoms, —O—, —S—, —SO$_2$—,

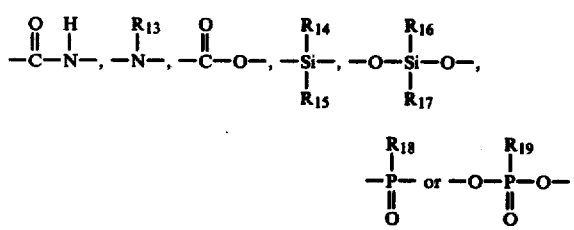

in which $R_{13}$, $R_{14}$, $R_{15}$, $R_{16}$, $R_{17}$, $R_{18}$ and $R_{19}$ are an aliphatic group or an aromatic group, and $R_{20}$ is

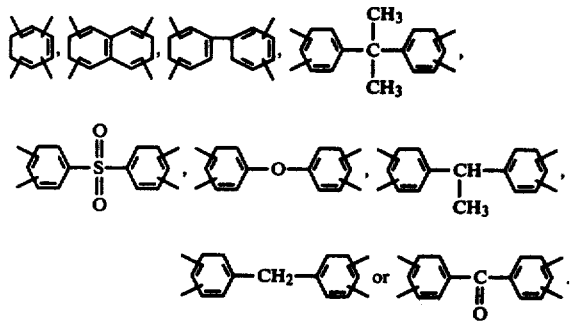

The preferable polyamide acids can be prepared by reacting an aromatic diamine of the general formula (V):

$$H_2N-R_{11}-NH_2 \qquad (V)$$

wherein $R_{11}$ is defined as above with an aromatic tetracarboxylic dianhydride having the general formula (VII):

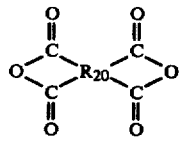

(VII)

wherein $R_{20}$ is defined as above.

The inherent viscosity of the preferable polyamide acid is in a range of 0.3 to 5.0. The inherent viscosity can be calcurated by inserting a value of a viscosity of a 0.5% solution and a value of a viscosity of a solvent which are measured at 30° C. into the following equation:

$$\text{Inherent viscosity} = \frac{\ln\left(\frac{\text{Solution viscosity}}{\text{Solvent viscosity}}\right)}{\text{Concentration (g./100 ml.)}}$$

Examples of the aromatic diamine of the general formula (V) are, for instance, m-phenylenediamine, p-phenylenediamine, 4,4'-diaminodiphenylpropane, 4,4'-diaminodiphenylmethane, benzidine, 4,4'-diaminodiphenylsulfide, 4,4'-diaminodiphenylsulfone, 3,3'-diaminodiphenylsulfone, 4,4'-diaminodiphenylether, 2,6-diaminopyridine, bis(4-aminophenyl)diethylsilane, bis(4-aminophenyl)diphenylsilane, 3,3'-dichlorobenzidine, bis(4-aminophenyl)ethylphosphineoxide, bis(4-aminophenyl)phenylphosphineoxide, bis(4-aminophenyl)-N-phenylamine, bis(4-aminophenyl)-N-methylamine, 1,5-diaminonaphthalene, 3,3'-dimethyl-4,4'-diaminodiphenyl, 3,3'-dimethoxybenzidine, an admixture thereof, and the like. Preferable examples of the diamine are 4,4'-diaminodiphenylpropane, 4,4'-diaminodiphenylmethane, 4,4'-diaminodiphenylether and an admixture thereof.

Examples of the aromatic tetracarboxylic dianhydride of the general formula (VII) are, for instance, pyromellitic dianhydride, 2,3,6,7-naphthalene tetracarboxylic dianhydride, 3,3',4,4'-diphenyltetracarboxylic dianhyride, 1,2,5,6-naphthalene tetracarboxylic dianhydride, 2,2',3,3'-diphenyltetracarboxylic dianhydride, 2,2-bis(3,4-dicarboxyphenyl)propane dianhydride, bis(3,4-dicarboxyphenyl)sulfone dianhydride, 3,4,9,10-perylene tetracarboxylic dianhydride, bis(3,4-dicarboxyphenyl)ether dianhydride, 1,2,4,5-naphthalene tetracarboxylic dianhydride, 1,4,5,8-naphthalene tetracarboxylic dianhydride, 2,2-bis(2,3-dicarboxyphenyl)propane dianhydride, 1,1-bis(2,3-dicarboxyphenyl)ethane dianhydride, 1,1-bis(3,4-dicarboxyphenyl)ethane dianhydride, bis(2,3-dicarboxyphenyl)methane dianhydride, bis(3,4-dicarboxyphenyl)methane dianhydride, bis(3,4-dicarboxyphenyl)sulfone dianhydride, benzene-1,2,3,4-tetracarboxylic dianhydride, 3,4,3',4'-benzophenone tetracarboxylic dianhydride, an admixture thereof, and the like. Preferable examples are pyromellitic dianhydride, 3,3'4,4'-diphenylcarboxylic dianhydride, benzene-1,2,3,4-tetracarboxylic dianhydride and an admixture thereof.

The polyamide acid used in the present invention as the precursor of the polyimide is not necessarily constructed completely by the amide acid units, but may partially include imide units, provided that the polyamide acid solution is prepared in a form of a homogeneous solution.

As the organic solvent used in the present invention, the known solvents for the polyamide acid can be employed. Examples of such solvent are, for instance, N,N-dimethylformamide, N,N-dimethylacetamide, N,N-diethylformamide, N,N-diethylacetamide, N,N-dimethylmethoxyacetamide, dimethylsulfoxide, hexamethylphosphoramide, N-methyl-2-pyrrolidone, dimethyl sulfone, tetramethylsulfone, an admixture thereof, and the like.

In addition, a mixture solvent of the above-mentioned solvent and a non-solvent for the polyamide such as benzene, toluene, xylene, benzonitrile, dioxane or cyclohexane may be employed.

The polyamide acid solution can be prepared by a usual process under general conditions. The polyamide acid having a usual inherent viscosity and a usual ratio of the amide acid unit and the imide unit can be employed.

Examples of the dehydrating agent used in the present invention are, for instance, an aliphatic acid anhydride, an aromatic acid anhydride, an N,N'-dialkylcarbodiimide, a lower fatty acid halide, a halogenated lower fattey acid halide, a halogenated lower fatty acid anhydride, arylphosphonic acid dihalide, thionyl halide and an admixture thereof. Preferable examples are a fatty acid anhydride such as acetic anhydride, propionic anhydride, butyric anhydride, and an admixture thereof.

Examples of the catalyst are, for instance, an aliphatic tertiary amine such as trimethylamine or triethylenediamine; an aromatic tertiary amine such as dimethylaniline; a heterocyclic tertiary amine such as pyridine, β-picoline, or isoquinoline, and the most preferable example is the heterocyclic tertiary amines.

Proportions of the respective component in the composition of the present invention vary depending on a molding manner and conditions. In a preferable embodiment, the polyamide acid solution contains 1 to 30% by weight, preferably 5 to 20% by weight as solid content. A preferable proportions of the other components are, on the basis of the repeated unit of the polyamide about 0.5 to 10 moles, particularly 2 to 6 moles of the dehydrating agent, 0.01 to 4 moles, particularly 0.1 to 2 moles of the catalyst, and 0.05 to 10 moles, particularly 0.1 to 4 moles of the pot life extending agent.

The pot life can be extended by increasing an amount of the pot life extending agent. In case of adding more than 10 moles of the pot life extending agent, however, the rate of the conversion cannot be so increased by heating, and then the producibility is lowered. On the other hand, in case of adding less than 0.05 mole of the pot life extending agent, the desired pot life extending effect of the composition cannot be obtained.

The term "pot life" herein is a period from the time when the dehydrating agent and the catalyst or the dehydrating agent, the catalyst and the pot life extending agent are added to the polyamide acid solution to the time when the viscosity of the polyamide acid composition drastically increases. At the time when the viscosity drastically increases, the polyamide acid composition cannot be molded any longer because the gelation of the polyamide acid occurs.

The polyamide acid composition can be obtained by admixing the dehydrating agent, the catalyst, pot life extending agent and the polyamide acid solution. The order of the addition is not particularly limited. In a preferable manner of the admixture, the dehydrating agent, the catalyst and the pot life extending agent are homogeneously admixed, and then the obtained admixture is blended together with the polyamide acid solution.

The molding operation of the polyamide acid composition of the present invention is carried out at −20° to 50° C., preferably at −5° to 30° C., more preferably at 5° to 20° C. In case where the molding operation is carried out at a lower temperature than the above temperature range, the pot life can be extended longer. In such case, however, the viscosity of the polyamide acid composition increases. Accordingly, the molding operation cannot be continuously carried out for a long time.

As mentioned above, the rate of the conversion of the polyamide acid to the polyimide in the composition of the present invention is lowered in the above temperature range, but when the composition is heated the rate of the conversion drastically increases as high as the rate of the conversion of the polyamide acid composition without any pot life extending agent. Therefore, it is preferable that the polyamide acid composition is heated after molding. The properties of the polyimide obtained by the process of the present invention are almost the same as those of polyimide obtained by the process (B-2).

The conversion of the polyamide acid to the polyimide can be determined by infrared absorption spectroscopy. Absorptions assigned to the amide acid group at 1310 cm$^{-1}$ and 3230 cm$^{-1}$ disappear and absorptions assigned to the imide group at 720 cm$^{-1}$ and 815 cm$^{-1}$ increase. The degree of the conversion and the rate of the conversion can be measured by tracing the disappearance of the absorptions.

As a result of such tracing, the rate of the conversion of the polyamide acid to the polyimide in the composition of the present invention is extremely lowered near the normal temperature in comparison with that in the polyamide acid composition without the pot life extending agent.

As mentioned above, the rate of the conversion drastically increases in proportion to temperature rise, and becomes as high as the rate of the polyamide acid composition without the pot life extending agent. In the process in which the rate of the conversion is controlled by selecting kinds and amounts of the dehydrating agent and the catalyst, however, the rate of the conversion remains low at an elevated temperature even if the desired pot life can be obtained at a operating temperature, which causes decrease of the producibility.

Although the mechanism of extension of the pot life is not yet comfirmed, it is considered that the conversion of the polyamide acid to the polyimide is extremely reduced at an operation temperature by a certain complex which is produced from the pot life extending agent and the dehydrating agent and/or the catalyst. The existence of such complex is presumed by the fact that new absorptions which are not belonged to any absorptions of the polyamide acid, the polyimide, the solvent, the pot life extending agent, the dehydrating agent and the catalyst are found in the infrared absorption spectrum.

In case where a N,N-dimethylacetamide solution of a polyamide acid prepared by reacting diaminodiphenyl ether with pyromellitic dianhydride is employed as the polyamide acid solution and isoquinoline is employed as the catalyst and acetic anhydride is employed as the dehydrating agent, the pot life at 30° C. can be extended to not less than 10 minutes when the pot life extending agent is added, while the pot life is not more than 8 minutes when the pot life extending agent is not added. The extension of the pot life at 30° C., i.e. two minutes is quite significant, and the difference of the pot life increases at a lower temperature. Furthermore, there is not substantial difference in the properties between the obtained polyimide films in the above two cases. On the other hand, the properties of the polyimide film prepared by the process in which the pot life is extended by selecting kinds and amounts of the catalyst and the dehydrating agent are remarkably inferior to the polyimide film obtained by the process of the present invention.

The polyamide acid composition can be molded in various conventional manners. For example, a film can be formed by extruding from a slit of a nozzle or by applying by means of a bar coater. A filament can be formed by extruding from a nozzle, and a casting product can be formed by casting in a mold. If necessary, the molded product may be heated to accelerate the evaporation of the solvent in the product and the completion of the conversion of the polyamide acid to the polyimide.

In general, in case where a molding material which can be easily cured is subjected to a continuous molding operation for a long time, it is very important to reduce a period for staying of the molding material at inner surfaces of a molding apparatus and a tube to a minimum, and to extend the pot life of the material. Such conditions can be obtained by employing a molding material having a low viscosity and the long pot life. As to the polyamide acid solution, since the polyamide acid solution has essencially a high viscosity, the polyamide acid solution is heated in order to decrease the viscosity of the solution. In that case, however, there is a problem that the pot life is shortened.

In case of employing the polyamide acid composition of the present invention, a long term continuous molding operation can be carried out at a higher temperature than the conventional molding operation while maintaining the composition in a low viscosity because the pot life of the polyamide acid composition is extended.

The restriction in the operation of feeding the polyamide acid composition under pressure through a tube can be reduced because the polyamide acid composition can be operated in a low viscosity.

Furthermore, since the polyamide acid composition can be operated at a higher temperature than the conventional manner, no cooling or slightly cooling is necessary for the treatment of the polyamide acid composition. Accordingly, facilities such as a cooling apparatus can be saved.

In general, the pot life is shortened depending on increase of a concentration of the polyamide acid solution. However, in case of employing the composition of the present invention including the pot life extending agent, the polyamide acid solution of a higher concentration can be employed. As a result, the amount of the solvent can be reduced, and then the cost of preparation of the polyimide can be saved.

The present invention is described and explained by means of the following Reference Examples, Examples and Comparative Examples. It is to be understood that the present invention is not limited to the Reference Examples, Examples and Comparative examples and various changes and modifications may be made in the invention without departing from the spirit and scope thereof.

REFERENCE EXAMPLE 1

Preparation of a polyamide acid solution

Into 70 g. of N,N-dimethylacetamide was dissolved 6.06 g. (0.0303 mole) of 4,4'-diaminodiphenylether. To the obtained reaction mixture was gradually added 6.605 g. (0.0303 mole) of pure pyromellitic dianhydride while keeping the reaction vessel at 60° C.

A further stirring for one hour after adding pyromellitic acid dianhydride, a solution of polyamide acid as a precursor of polyimide was obtained. The solution had a concentration of 15.32% by weight as a solid and an inherent viscosity of 2.0.

REFERENCE EXAMPLE 2

Preparation of a polyamide acid solution

The procedure of Reference Example 1 was repeated except that N,N-dimethylformamide was employed instead of N,N-dimethylacetamide. The obtained solution had a concentration of 15.32% by weight as a solid and an inherent viscosity of 1.5.

REFERENCE EXAMPLE 3

Preparation of a polyamide acid solution

The procedure of Reference Example 1 was repeated except that N-methyl-2-pyrrolidon was employed instead of N,N-dimethylacetamide. The obtained solution had a concentration of 15.32% by weight as a solid and an inherent viscosity of 2.1.

REFERENCE EXAMPLE 4

Preparatin of a polyamide acid solution

The procedure of Reference Example 1 was repeated except that 6.00 g. (0.0303 mole) of 4,4'-diaminodiphenylmethane was employed instead of 4,4'-diaminodiphenylether. The obtained solution had a concentration of 15.26% by weight as a solid and an inherent viscosity of 1.8.

EXAMPLE 1

To 50 g. of a polyamide acid solution obtained in Reference Example 1 were added and mixed 7.47 g. of acetic anhydride, 1.18 g. of isoquinoline and 1.83 g. of acetylacetone to give a polyamide acid composition of the present invention.

The pot life of the obtained compositions was 25 min. at 30° C. and 540 min. at 4° C.

The obtained polyamide acid composition was applied with a bar coater on an aluminum foil of 30 μm. in thickness to give a polyamide acid coating membrane of about 300 μm. in thickness, and was heated in an oven at 100° C. for a few minutes until the polyamide acid composition was gelled. The gelled coating membrane was peeled from the aluminum foil and fixed with frames on all sides, and was heated at 150° C. for 10 min., and at 300° C. for 30 min. to give a polyimide film. The obtained polyimide film had a tensile strength of 20 kg./mm.$^2$ and a tensile elongation of 82%.

COMPARATIVE EXAMPLE 1

The procedure of Example 1 was repeated except that acetylacetone was not employed to give a comparative polyamide acid composition.

The pot life of the obtaiend composition was 8 min. at 30° C. and 95 min. at 4° C.

A polyimide film obtained by the same manner as in Example 1 had a tensile strength of 20 kg./mm.$^2$ and a tensile elongation of 85%.

In comparison with Comparative Example 1, the pot life of Example 1 is about three times at 30° C. and about 5.6 times at 4° C. of comparative Example 1, and yet the properties of the polyimide film obtained in Example 1 are not reduced.

EXAMPLES 2 TO 5

The procedure of Example 1 was repeated except that a pot life extending agent described in Table 1 was employed instead of acetylacetone in an amount shown in Table 1 to give a polyamide acid composition of the present invention.

The pot life of the obtained compositions measured at 30° C. and tensile elongations of the polyimide films are shown in Table 1.

TABLE 1

| Pot life extending agent | Amount (g.) | pot life (min.) | tensile elogation (%) |
|---|---|---|---|
| methylacetoacetate | 1.06 | 15 | 75 |
| ethylacetoacetate | 1.19 | 20 | 70 |
| acetoacetanilide | 0.81 | 16 | 69 |
| malononitrile | 0.60 | 19 | 73 |

EXAMPLE 6

To 50 g. of the polyamide acid solution obtained in Reference Example 2 were added and mixed 7.47 g. of acetic anhydride, 1.18 g. of isoquinoline and 1.83 g. of acetylacetone to give a polyamide acid composition of the present invention.

The pot life of the obtained composition was 25 min. at 30° C. A polyimide film was formed by the same manner as in Example 1. The obtained film had a tensile strength of 19.7 kg./mm.$^2$ and a tensile elongation of 57%.

COMPARATIVE EXAMPLE 2

The procedure of Example 6 was repeated except that acetylacetone was not employed to give a polyamide acid composition.

The pot life of the obtained composition was 7 min. at 30° C. A polyimide film formed from the composition had a tensile strength of 19.8 kg./mm.$^2$ and a tensile elongation of 60%.

EXAMPLE 7 AND COMPARATIVE EXAMPLE 3

The procedure of Example 1 was repeated except that 9.51 g. of propionic anhyhidride was employed instead of acetic anhydride to give a polyamide acid composition of the present invention.

The pot life of the obtained composition was 17 min. at 30° C., and a polyimide film formed from the composition had a tensile elongation of 48%.

On the other hand, in case of a comparative polyamide composition withut acetylacetone, the pot life of the obtained comparative composition was 7 min. at 30° C., and a polyamide film formed from said composition had a tensile elongation of 54%.

EXAMPLE 8 AND COMPARATIVE EXAMPLE 4

The procedure of Example 1 was repeated except that the polyamide acid solution obtained in Reference Example 3 was employed to give a polyamide acid composition of the present invention. The pot life of the obtained composition was 30 min. at 30° C., and a polyimide film formed from the composition had a tensile strength of 20.8 kg./mm.$^2$ and a tensile elongation of 85%.

On the other hand, in case of a comparative polyamide acid composition without acetylacetone, the pot life of the obtained comparative composition was 8 min. at 30° C. and a polyimide film formed from said composition had a tensile elongation of 87%.

EXAMPLE 9 AND COMPARATIVE EXMAPLE 5

The procedure of Example 1 was repeated except that the polyamide acid solution obtained in Reference Example 4 was employed to give a polyamide acid composition of the present invention.

The pot life of the obtained compostion was 20 min. at 30° C.

On the other hand, in case of a comparative polyamide acid composition without acetylacetone, the pot life of the obtained comparative composition was 7 min. at 30° C. There is no substantial difference in tensile elongations between the polyimide films formed from the respective compositions.

COMPARATIVE EXAMPLE 6

To 50 g. of the polyamide acid solution obtained in Reference Example 1 were added and mixed 5.60 g. of acetic anhydride and 0.71 g. of isoquinoline to give a comparative polyamide acid composition. The pot life of the obtained polyamide acid composition was 13 min. at 30° C., and a polyimide film formed from the comparative composition had a tensile elongation of 50%.

Though the pot life can be extended by reducing amounts of the dehydrating agent and the catalyst, the tensile elongation of the obtained polyimide film is remarkably reduced.

COMPARATIVE EXAMPLE 7

To 50 g. of the polyamide acid solution obtained in Reference Example 1 were added and mixed 16.56 g. of benzonic anhydride and 1.18 g. of isoquinoline to give a comparative polyamide acid composition. The pot life of the obtained composition was 30 min. at 30° C., and a polyimide film formed from the comparative composition had the tensile elongation of 30%.

Although the pot life can be extended by altering a kind of the dehydrating agent, the tensile elongation of the obtained polyimide film is remarkably reduced.

COMPARATIVE EXAMPLE 8

To 50 g. of the polyamide acid solution obtained in Reference Example 1 were added and mixed 7.47 g. of acetic anhydride and 0.93 g. of triethylamine were to give a comparative polyamide acid composition. The pot life of the obtained composition was 25 min. at 30° C. A polyimide film could not be formed from the comparative composition in the same manner as in Example 1 because a coating membrane could not be peeled due to its insufficient gelation.

In case of extending the pot life by altering the catalyst, it is difficult to form a polyimide film due to its insufficient gelation of the comparative polyamide acid composition.

COMPARATIVE EXAMPLE 9

To 50 g. of the polyamide acid solution obtained in Reference Example 1 were added and mixed 7.47 g. of acetic anhydride and 0.85 g. of β-picoline to give a comparative polyamide acid composition. The pot life of the obtained composition was 8 min. at 30° C. and a polyimide film formed from the comparative composition had a tensile elongation of 80%.

In case of maintaining the tensile elongation of the polyimide film by altering the catalyst, the pot life is shortened.

EXAMPLE 10

To the polyamide acid solution obtained in Reference Example 1 were continuously added and mixed 4 moles of acetic anhydride, 0.5 mole of isoquinoline and 1 mole of acetylacetone per the repeated unit of the polyamide acid were continuously added and mixed to the polyamide acid solution obtained in Reference Example 1 to give a polyamide acid composition of the present invention. Then, the obtained composition was continuously provided to slit die of the extruder at 10° C.

There happened no trouble in the continuous extrusion molding for 8 hrs.

On the other hand, when a comparative polyamide acid composition which was prepared without mixing acetylacetone was subjected to slit extrusion molding as the above mentioned, the extrusion molding could not be carried out any more beyond about one hour due to sticking and accumulation of gelled substances on the inner surface of the slit.

What we claimed is:

1. A polyamide acid composition for preparing a polyimide which can extend the pot life of the composition, said composition comprising;
   (a) a solution of a polyamide acid in an organic solvent the solid content of which is in the range of 1 to 30% by weight, the polyamide acid being a precursor of the polyimide,
   (b) a dehydrating agent in an amount within the range of 0.5 to 10 moles on the basis of the repeated unit of the polyamide,
   (c) a catalyst in an amount within the range of 0.01 to 4 moles on the basis of the repeated unit of the polyamide, and
   (d) a pot life extending agent which can lower a rate of conversion of the polyamide acid to the polyimide in an amount within the range of 0.05-10 moles on the basis of the repeated unit of the polyamide, said pot life extending agent being at least one member selected from the group consisting of a compound of the general formula (I):

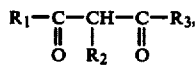
   (I)

a compound of the general formula (II):

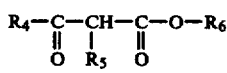
   (II)

a compound of the general formula (III):

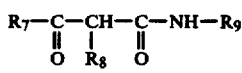
   (III)

and a compound of the general formula (IV):

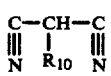
   (IV)

wherein $R_1$, $R_3$, $R_4$, $R_6$, $R_7$ and $R_9$ are the same or different and each is an aliphatic group having 1 to 12 carbon atoms or an aromatic group, $R_2$, $R_5$, $R_8$ and $R_{10}$ are hydrogen, an aliphatic group having 1 to 12 carbon atoms or an aromatic group, and, $R_1$ and $R_3$, $R_4$ and $R_6$, $R_7$ and $R_9$ in the respective formula may be bound together to form a ring.

2. The composition of claim 1, wherein said dehydrating agent is an aliphatic acid anhydride.

3. The composition of claim 1, wherein said catalyst is isoquinoline.

4. A process for preparing a polyimide which comprises admixing;
   (a) a solution of a polyamide acid in an organic solvent, the solid content of which is in the range of 1 to 30% by weight, the polyamide acid being a precursor of the polyimide,
   (b) a dehydrating agent in an amount within the range of 0.5 to 10 moles on the basis of the repeated unit of the polyamide,
   (c) a catalyst in an amount within the range of 0.01 to 4 moles on the basis of the repeated unit of the polyamide, and
   (d) a pot life extending agent which can lower a rate of conversion of the polyamide acid to the polyimide, in an amount within the range of 0.05-10 moles on the basis of the repeated unit of the polyamide, said pot life extending agent being at least one member selected from the group consisting of a compound of the general formula (I):

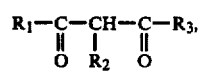
   (I)

a compound of the general formula (II):

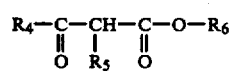
   (II)

a compound of the general formula (III):

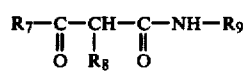
   (III)

and a compound of the general formula (IV):

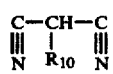
   (IV)

wherein $R_1$, $R_3$, $R_4$, $R_6$, $R_7$ and $R_9$ are the same or different and each is an aliphatic group having 1 to 12 carbon atoms or an aromatic group, $R_2$, $R_5$, $R_8$ and $R_{10}$ are hydrogen, an aliphatic group having 1 to 12 carbon atoms or an aromatic group, and, $R_1$ and $R_3$, $R_4$ and $R_6$, $R_7$ and $R_9$ in the respective formula may be bound together to form a ring, to prepare a polyamide acid composition, and converting the polyamide acid to the polyimide.

5. The process of claim 4, wherein said polyamide acid composition is prepared by blending a homogeneous mixture of the dehydrating agent, the catalyst and the pot life extending agent together with the solution of the polyamide acid.

6. The process of either claim 4 or claim 5, wherein said polyamide acid composition is allowed to stand and is then heated.

7. The process of claim 4, wherein said dehydrating agent is an aliphatic acid anhydride.

8. The process of claim 4, wherein said catalyst is isoquinoline.

* * * * *